United States Patent [19]

Ishikawa

[11] Patent Number: 4,531,157
[45] Date of Patent: Jul. 23, 1985

[54] METHOD AND APPARATUS FOR AUTOMATIC FOCUSING IN VIDEO CAMERA

[75] Inventor: Katsuji Ishikawa, Higashiosaka, Japan

[73] Assignee: West Electric Co., Ltd., Osaka, Japan

[21] Appl. No.: 488,162

[22] Filed: Apr. 25, 1983

[30] Foreign Application Priority Data

Apr. 28, 1982 [JP] Japan .................................. 57-71809

[51] Int. Cl.³ ............................................ H04N 5/26
[52] U.S. Cl. .................................... 358/227; 354/400
[58] Field of Search ............... 358/227, 224, 105, 126, 358/125, 209; 354/400, 401, 402, 403, 430, 404, 405, 406, 407, 408, 409

[56] References Cited

U.S. PATENT DOCUMENTS

| 4,178,087 | 12/1979 | Shenk et al. | 354/401 |
| 4,218,119 | 8/1980 | Schickedanz | 354/430 |
| 4,294,531 | 10/1981 | Shenk | 354/401 |
| 4,320,948 | 3/1982 | Hosoe et al. | 354/430 |

Primary Examiner—Gene Z. Rubinson
Assistant Examiner—Stephen Brinich
Attorney, Agent, or Firm—Stevens, Davis, Miller & Mosher

[57] ABSTRACT

A method and apparatus for automatically adjusting a focal point of a taking lens in an apparatus such as a video camera or the like designed for reproducing continuously a behavior of an object. Provided are a detection and recognition step for determining whether the object is in motion and a control step for controlling in dependence on the output of the detection and recognition step a time interval at which a distance measuring step for measuring a distance to the object is performed in such a manner that the time interval for the stationary object is longer as compared with the case where the object is moving, whereby energy consumption is suppressed to a minimum.

6 Claims, 4 Drawing Figures

METHOD AND APPARATUS FOR AUTOMATIC FOCUSING IN VIDEO CAMERA

BACKGROUND OF THE INVENTION

The present invention relates to a method and apparatus for automatically adjusting a focal point of a taking lens in an apparatus such as a video camera or the like designed for reproducing continuously a state or behavior of an object.

The hitherto known methods of automatically adjusting a focal point of a taking lens (or automatic focusing) by detecting a distance to an object may be classified into an optical type and an ultrasonic type in accordance with the types of a media made use of in the measurement of the distance to the object, or alternatively they may be classified into an active type or a passive type in dependence on the types of processings of the media.

On the other hand, as the apparatus which incorporates a taking lens and in which the automatic focusing can be effectively adopted, there are known various types inclusive of still cameras, video or television cameras and others. In reality, the automatic focusing is practically applied.

In any type of the automatic focusing methods mentioned above, the distance measuring operation for deriving information or data of the distance to the object involves consumption of energy. Among others, the automatic focusing system of the active type requires a relatively great deal of energy for operation.

As to the energy consumption involved in the distance measuring operation, the apparatus in which the focusing has to be accomplished within an extremely short time as is the case in the still camera, i.e. the apparatus designed for reproducing only the instantaneous state or behavior of an object to be photographed is accompanied with no serious problem in connection with the energy consumption, since a single distance measuring operation is sufficient for the picture taking operation.

In contrast, in the case of an apparatus such as a video camera and the like which are intended for continuous reproduction of the state or behavior of an object, successive distance measuring operations for following up the object are required in taking picture of the object in motion. To this end, the distance measuring operation has heretofore been carried out successively and periodically at a predetermined time interval, thus involving an extremely large amount of energy consumption when compared with the distance measuring operation in the still camera and the like.

SUMMARY OF THE INVENTION

An object of the present invention is to provide an automatic focusing method and apparatus for a video camera and the like which are capable of reducing energy consumption involved in the distance measuring operation.

In view of the above object, it is proposed according to an aspect of the invention that a time interval at which the distance measuring operation is performed is made different in dependence on whether an object to be taken is stationary or in motion so that the distance measuring operation takes place at a longer interval when the object is stationary.

DESCRIPTION OF THE PREFERRED EMBODIMENTS

Figure 1:
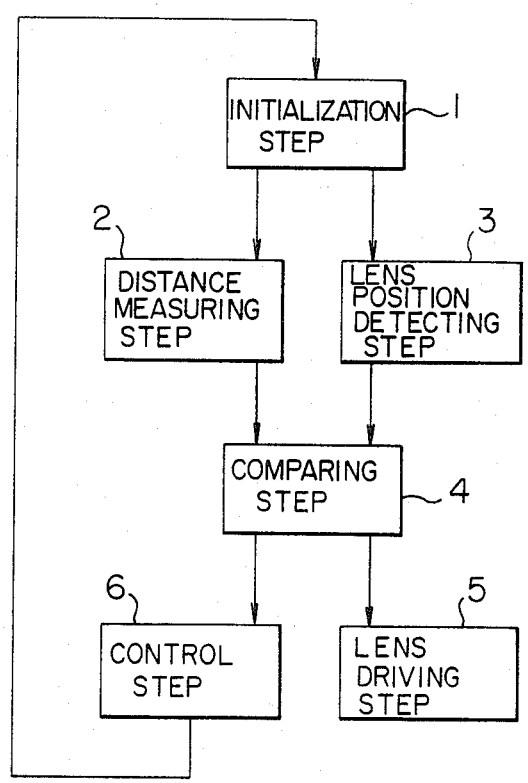
Fig. 1 is a block diagram for illustrating the principle of the automatic focusing method according to the invention.

As will be seen from FIG. 1, an automatic focusing method according to the present invention includes an initialization step 1 in which energy supply for executing successive steps mentioned below is effected and initiation timings for these successive steps is set in response to an input signal applied externally, a distance measuring step 2 for measuring a distance to an object, a lens position detecting step 3 for detecting a position of a taking or focusing lens, a comparing step 4 in which distance information obtained in the distance measuring step 2 is compared with lens position information obtained in the lens position detecting step 3, a driving step 5 in which the taking lens is driven in accordance with the information or data obtained in the comparing step 4, and a control step 6 for controlling the initialization step 1 in accordance with the result of the comparing step 4.

Relationships among the individual steps will be described in more detail. Assuming that the initialization has been completed in the step 1 so that the other steps are in a state ready to be executed, the distance information and the lens position information are first obtained in the distance measuring step 2 and the lens position detecting step 3, respectively. Subsequently, lens driving information indicative of a displacement of the taking lens to be effected as well as a direction in which the taking lens is to be moved is derived from the result of comparison between the distance information and the lens position information in the step 4. In succession to the determination of the lens driving information, the lens driving step 5 or the control step 6 is finally to be carried out. The lens driving step 5 is selected when the lens driving information indicative of the displacement of the lens and the direction thereof is resulted from the comparing step 4, whereby the taking lens is driven to a position commanded by the lens driving information.

On the other hand, when no information concerning the displacement of the lens and the direction thereof is resulted from the comparing step 4, i.e., when the distance information coincides with the lens position information, indicating the focused state of the taking lens, the control step 6 is selected, to thereby interrupt the initialization step 1 for a predetermined time. In this way, when the comparison effected in the step 4 results in the coincidence, the carrying out of the distance measuring step 2 and others are interrupted for a predetermined time.

When the result of the comparison is inconsistent, the lens driving step 5 is selected without the control step 6 being activated. In this case, the distance measuring step 2 as well as other relevant steps are so controlled as to be performed at the predetermined time interval initialized in the initialization step 1 in response to a signal produced at the end of the lens driving step 5.

As will be appreciated from the above description of the individual steps, the automatic focusing method according to the present invention is characterized by the control step 6 which controls the operations set in the initialization step 1 in accordance with the information derived from the comparison step 4. More specifically, when the distance information derived from a given distance measuring operation in the distance measuring step coincides with the information of the instant lens position of the taking lens controlled to a given position through the preceding focusing operation, which information is derived from the lens position detecting step 3, it is determined that the object is not moving but stands stationary, whereby the distance measuring step 2 to follow up the object is spared.

A means for making decision as to whether the object is stationary or not is never restricted to a comparison means for comparing the distance information with the lens position information, but other detecting means capable of deriving a signal representative of the focused state such as hitherto known blur detecting means may equally be employed to this end.

Thus, in view of the operation of the automatic focusing in the invention, the distance measuring step is effected at a shorter time interval unless the focused state is maintained, while the distance measuring operation is performed at a longer time interval when the focused state is maintained, to thereby reduce the energy consumption involved in the distance measuring operation.

Figure 2:
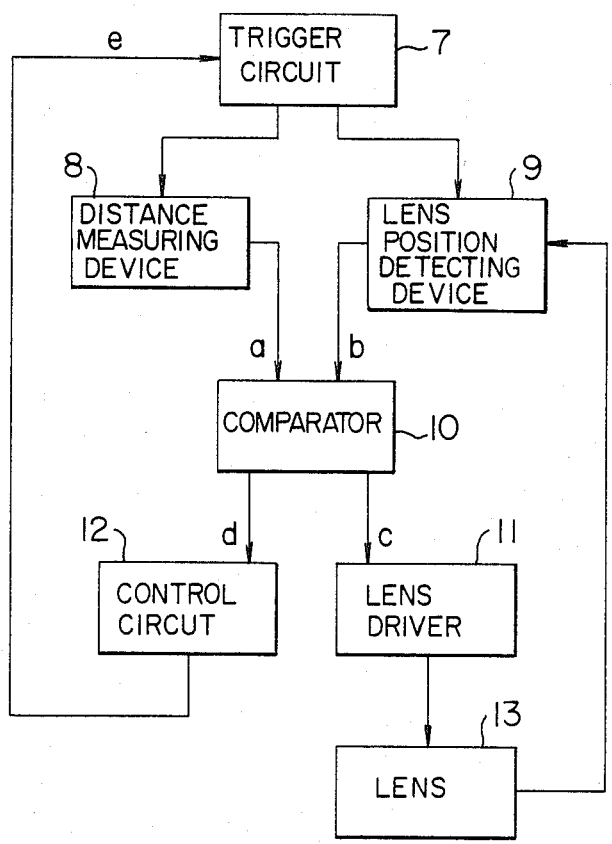
FIG. 2 is a block diagram showing a general arrangement of an automatic focusing apparatus according to the present invention.

Referring to FIG. 2 which shows in a block diagram an automatic focusing apparatus according to the present invention, when a trigger circuit 7 is activated by means of a manipulating button or in response to an activation signal produced by a suitable means, a distance measuring device 8 and a lens position detecting device 9 are brought into operation to produce a distance signal a and a lens position signal b, respectively. The distance signal a and the lens position signal b are applied to the inputs of a comparator circuit 10 to be compared with each other. When the result of the comparison performed by the comparator circuit 10 results in an out-of-coincidence, indicating an out-of-focus state, a lens driving signal c for commanding a displacement of the taking lens as well as a direction thereof is applied to a lens driver circuit 11. On the other hand, when the comparison results in coincidence, indicating the focused state, a command signal d is applied to a control circuit 12 for controlling the operation of the trigger circuit 7.

The lens driver circuit 11 responds to the lens driving signal c supplied from the comparator circuit 10 for driving a lens 13 to a predetermined position, i.e., a focused position by way of an electric motor (not shown), for example.

On the other hand, the control circuit 12 responds to the command signal d supplied from the comparator circuit 10 and supplies to the trigger circuit 7 a rest signal e for rendering the latter in a rest state for a predetermined period, whereby the state of the trigger circuit 7 is changed.

In other words, in the automatic focusing apparatus according to the present invention, the time interval at which the distance measuring operation is activated by the trigger circuit 7 is controlled in dependence on the presence or absence of the focused state brought about by the preceding distance measuring operation of the distance measuring device 8, whereby energy consumption can be controlled in an extremely effective manner.

Figure 3:
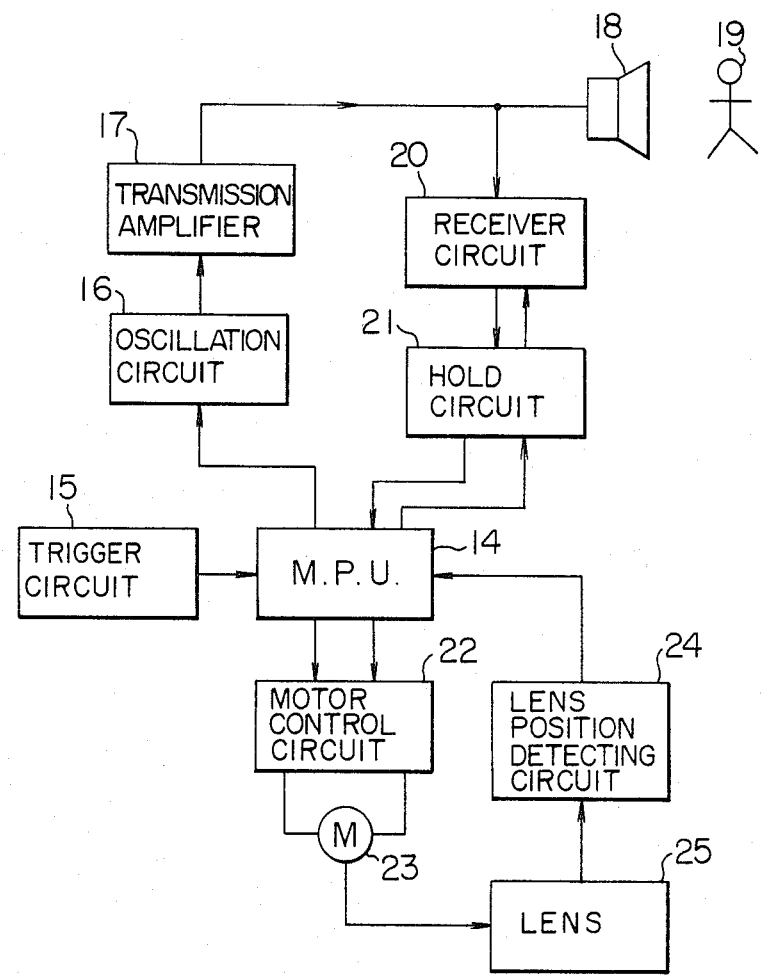
FIG. 3 is a block diagram showing an arrangement of the automatic focusing apparatus according to the invention in which an ultrasonic wave is used for the distance measuring operation.

FIG. 3 shows in a block diagram of another embodiment of the automatic focusing apparatus according to the present invention in which an ultrasonic wave is used.

In this figure, a reference numeral 14 denotes a microprocessor unit (hereinafter referred to as MPU in abridgement) which is adapted to produce signals for controlling the operation of a motor 23 for driving a taking lens 25 and the emission of the ultrasonic wave in response to various input signals, as will hereinafter be described in detail. A reference numeral 15 denotes a trigger circuit for supplying to the MPU 14 a signal for initiating the emission or transmission of the ultrasonic wave, 16 denotes an oscillation circuit whose operation is controlled by a signal supplied from the MPU 14, 17 denotes an amplifier circuit for transmission, 18 denotes an ultrasonic wave sensor for transmitting and receiving the ultrasonic wave, 19 denotes an object to be taken, 20 denotes a receiver circuit for detecting a signal received by the ultrasonic wave sensor 18, 21 denotes a signal hold circuit adapted to perform signal transfer to and from the receiver circuit 20, thereby to set a timing for the receiver circuit 20 to be operated or to shape the waveform of the received signal, 22 denotes a motor control circuit to control the operation of the motor 23 coupled mechanically to the lens 25 and hence the displacement of the latter in dependence on the output signal from the MPU 14, and a numeral 24 denotes a lens position detecting circuit for detecting a position of the lens 25 which is displaced to various positions by the driving motor 23 and for converting the detected lens position into a corresponding electrical signal.

With the arrangement of the automatic focusing apparatus described above, the various steps of the automatic focusing illustrated in FIG. 1 are executed under the control of the MPU 14 in a manner described below in detail by referring to the flow chart shown in FIG. 4.

Referring to FIG. 3, when the MPU 14 is energized by means of a power supply switch (not shown), the MPU 14 executes a processing for initialization at a step 100 (in FIG. 4), whereby peripheral circuits are set to an inactive state.

At a succeeding step 101, decision is made as to whether the automatic focusing apparatus is to be used or not, although this step is not illustrated in FIG. 3. More specifically, it is decided at this step 101 which of an automatic operation mode in which the picture taking lens is automatically controlled and a manual operation mode in which the lens is manually controlled has been selected by the user. When the decision made in the step 101 indicating that the manual control mode has been selected, the routine returns to the step 100, while it procedes to a step 102, when the decision in the step 101 indicates the selection of the automatic control mode.

In the step 102, the MPU 14 connects the peripheral circuits to the power supply source to set them in the active state, thereby preparing for realizing the automatic lens control.

Subsequently, an ultrasonic wave signal is transmitted to the object 19 to be photographed through operations of the oscillation circuit 16, the amplifier 17 for transmission and others. To this end, in a step 103 which succeeds to the step 102, it is determined whether a start signal produced by the trigger circuit 15 is inputted.

In this connection, the output signal of the trigger circuit 15 may be derived from a vertical synchronizing signal on the assumption that the invention is applied to a video camera.

When the start signal produced by the trigger circuit 15 is detected in the step 103, the routine executed by the MPU 14 procedes to a step 104 in which oscillation of the oscillation circuit 16 is at first initiated, whereupon an oscillating signal output from the oscillator circuit 16 is supplied to the transmission amplifier circuit 17 to be supplied to the ultrasonic sensor 18 after having been amplified. The ultrasonic sensor 18 then starts transmission of the ultrasonic wave to the object 19. Simultaneously with the initiation of transmission of the ultrasonic wave, the signal being sent may undesirably be supplied to the receiver circuit 20 and the hold circuit 21, eventually making it impossible to perform the detection of the received signal.

Under the circumstances, when the oscillation of the oscillator circuit 16 is initiated in the step 104, the MPU 14 disables the operation of the hold circuit 21 in a next step 105. In this way, so long as the hold circuit 21 is disabled, the hold circuit 21 is protected from erroneous detecting operation due to the signal being transmitted, even when the signal supplied to the ultrasonic sensor 18 for transmission should be picked up by the receiver circuit 20.

When a time which can be arbitrarily set internally of the MPU 14 elapsed after the execution of the steps 104 and 105, the oscillation of the oscillator circuit 16 is stopped in a step 106, which means that the generation of the ultrasonic wave as well as transmission thereof is terminated. In this sense, it can be said that the time duration for transmission of the ultrasonic wave is determined by the step 106. Upon termination of the transmission of the ultrasonic wave in the step 106, the apparatus is set to a state ready for detecting a reflection wave or echo from the object 19.

More specifically, in a step 107, the hold circuit 21 is released from the reset state effected in the preceding step 105 to be restored to an enabled state, while measurement of time by a timer is started in a step 108 for detecting a time which is taken for the reflected wave or echo from the object to be received.

Subsequently, the reflected wave is detected by the receiver circuit 20 in a step 109 to be inputted to the MPU 14 by way of the hold circuit 21 as the reception signal. More specifically, it is determined in the step 109 whether the reflected wave from the aimed object 19 is detected or not by the receiver circuit 20. When the reflected wave from the aimed object 19 is detected by the receiver circuit 20 and inputted to the MPU 14 by way of the hold circuit 21, resulting in that the presence of the reception signal is confirmed in the step 109, the measurement of time by the timer started in the preceding step 108 is stopped in a next step 110.

When the reflected wave is not detected by the receiver circuit 20 for reason that the object is located at infinity, the timer activated in the step 108 is stopped automatically in the step 110 after lapse of a predetermined time with the step 109 being skipped.

The timer mentioned in conjunction with the steps 108 and 110 may be constituted, for example, by a counter inherently incorporated in the MPU 14. By way of example, when arrangement is made such that the operating state of the hold circuit 21 is charged every time the receiver circuit 20 detects the reception signal, the step 109 may be realized as the step for determining the state of the hold circuit 21 with a predetermined period by detecting the potential at a predetermined circuit point of the hold circuit 21. Then, the step 108 can be realized through the incrementing or up-counting operation of the counter effected every time the determination in the step 109 is done. In this way, the content of the counter is incremented in the predetermined period to perform the time measuring function, whereby the steps 109 and 108 can be executed in parallel with each other, allowing thus the processing for detecting the reflected wave from the aimed object to be executed in an extremely effective manner.

When the time measuring operation of the timer is terminated in the step 110, the content of the timer counter at that time point represents of course the distance to the aimed object. Accordingly, the time data held by the timer counter at that time is processed to be converted into a distance signal in a step 111. The conversion processing in this step 111 is effected by the MPU 14 by taking into account various correcting signals such as a correction signal prepared in consideration of an ambient temperature, a correction signal considering positional relationship between the lens 25 and the ultrasonic wave sensor 18, which signals are inputted to the MPU 14, although not shown in FIG. 3.

The distance signal resulting from the arithmetic processing in the step 111 is compared with the lens position signal representative of the lens position supplied to the MPU 14 from the lens position detecting circuit 24 in a step 112. Needless to say, the function of the step 112 is to determine whether or not the distance signal is equal to or coincide with the lens position signal.

When the comparison in the step 112 results in that the distance signal is out of coincidence with the lens position signal, this means that the lens position does not correspond to the distance to the object, requiring adjustment of the lens 25. Accordingly, the program procedes to a step 113 where the rotation of the motor 23 is carried out in accordance with the result of the comparison made in the step 112. Since the motor 23 is driven under the control of the motor control circuit 22, as is shown in FIG. 3, information representative of the result of the comparison made in the step 112 is supplied to the motor control circuit 22 from the MPU 14, whereby the motor 23 is rotated by way of the motor control circuit 22 for an angular distance corresponding to the aforementioned information.

When the rotation of the motor 23 is thus started, the comparison of the distance signal with the lens position signal is again effected in a step 114. It will readily be understood that the lens 25 is displaced as the motor 23 is rotated, resulting in that the lens position signal detected by the lens position detecting circuit 24 is varied from time to time. Accordingly, the function of the step 114 is to detect comparatively a variation in the relationship between the distance signal and the lens position signal which varies as the lens 25 is displaced.

When the comparison made in the step 114 results in coincidence, the rotation of the motor 23 is stopped in a step 115. More particularly, the coincidence in the result of the comparison performed in the step 114 means that the displacement of the lens 25 brought about through rotation of the motor 23 is effected to the position which corresponds to the distance signal and represents the focused state. Accordingly, further rotation of the motor 23 is no more required. Thus, the rotation of the motor 23 is stopped in the step 115.

When the rotation of the motor 23 is stopped in the step 115 in this way, the process returns to the step 101 again, whereby the control routine mentioned above is repeated to maintain the lens 25 constantly in the focused state.

On the other hand, when the comparison effected in the step 112 for commanding the rotation of the motor 23 results in that the lens position signal coincides with the distance signal, a step 116 is selected, in which a predetermined stand-by time is set. After lapse of this predetermined stand-by time, execution of the step 101, is executed again, whereby the control routine is repeated in the same manner as is the case of the finish of the step 115.

Figure 4:
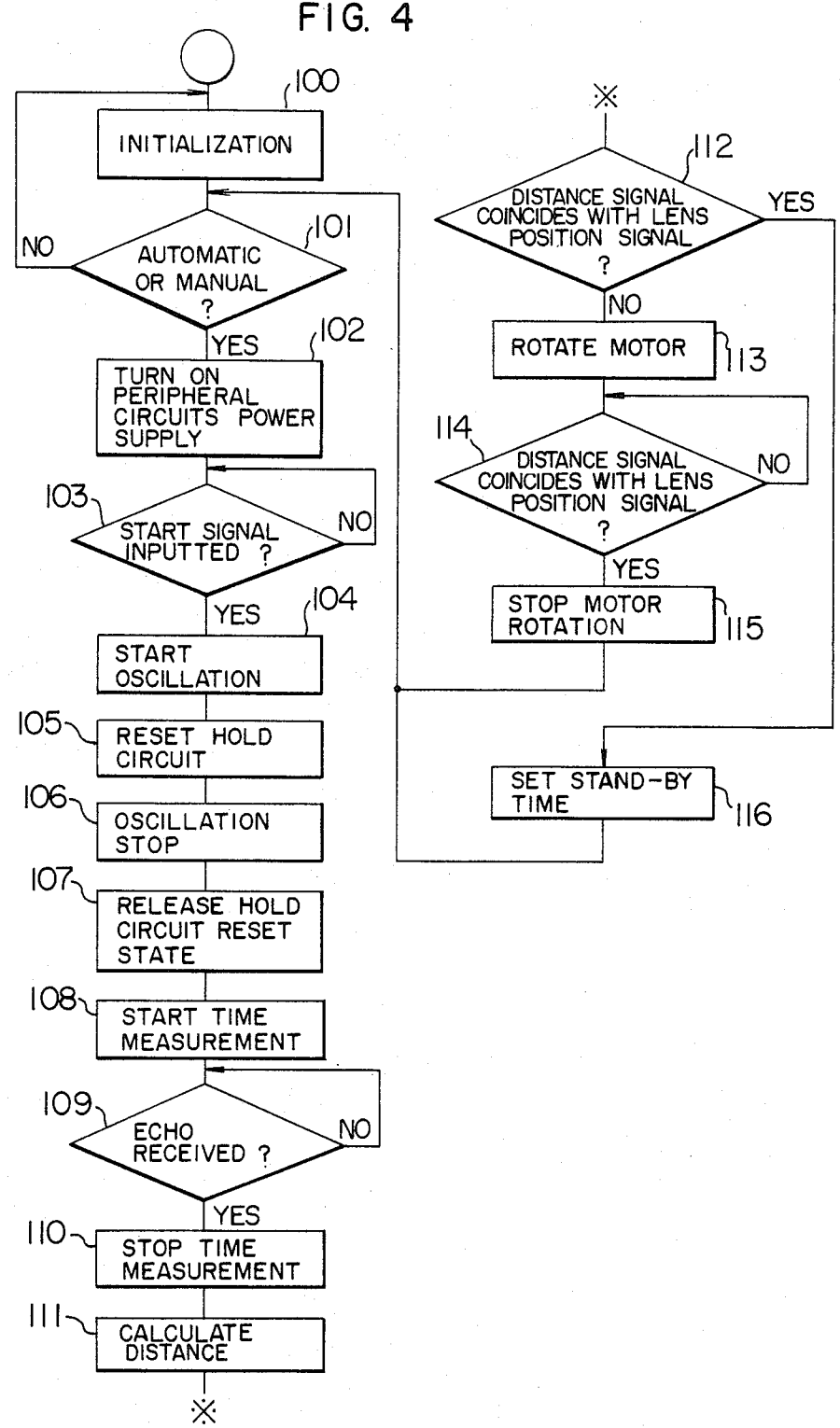
FIG. 4 shows a flow chart for illustrating the operation of the automatic focusing apparatus shown in FIG. 3.

In the foregoing, description of the automatic focusing apparatus according to the embodiment of the invention shown in FIG. 3 has been described with the aid of the flow chart shown in FIG. 4. In the following, the stand-by time step 116 will be described in more detail.

In general, in an apparatus designed for reproducing a continuous behavior of an object, displacement characteristic or follow-up characteristic of the taking lens for establishing the focused state even when the object is moving has to be taken into consideration. Further, the time elapsing from the distance measuring step until the establishment of the focused state through operation of the lens driving motor 23 has to be as short as possible. In consideration of these requirements, the illustrated embodiment of the invention is so arranged that the processing which follows the step 111, inclusive, can be executed immediately when the echo from the object is received.

For example, when the distance to the object 19 is constant at 2 m with the temperature being 15° C., a time T elapsing from transmission of the ultrasonic wave to the reception thereof is about 12 msec. Assuming that the step 116 is absent in the flow chart shown in FIG. 4, execution of the individual steps in succession to the step 101 for returning again to the latter will requires a time span of about 12 msec.

When the start pulse used in the step 103 is derived from the vertical synchronizing signal, as described hereinbefore, the repetitive execution of the individual steps which follows the step 101 is effected in synchronism with the vertical synchronizing signal of which period is 1/60 sec (nearly 16.7 msec). This means that the repetitive execution of the steps in succession to the step 101 is made as many as 60 times per second, being accompanied with energy consumption for transmission of the ultrasonic wave.

Obviously, the above mentioned type of operation involves a serious problem that the life of a battery employed as the power supply source for the apparatus is significantly shortened due to the wastage of energy involved in the aforementioned repetitive operation. The stand-by step 116 is provided for preventing such wastage of energy. More specifically, when the stand-by time is set in the step 116 because of the aimed object being stationary, the step 101 is not regained until the set stand-by time has elapsed, with the result that the individual steps succeeding to the step 101 are not executed regardless of application of the vertical synchronizing signal. In other words, so long as the aimed object stands stationary, the interval at which the distance measuring operation is effected becomes considerably longer. For example, the repetitive execution of the steps which follow the step 101 can be decreased to a few times per second by correspondingly setting the stand-by time, whereby the quantity of energy consumed for transmission of the ultrasonic wave, etc., can be reduced significantly as compared with the case in which the step 116 is not employed, assuring thus an improved energy utilization.

The duration of the stand-by time set in the step 116 may be so selected that operation of the driving system for the lens 25, i.e., execution of the steps 113 et seq. can be restarted upon movement of the object with such a degree of delay which gives no uneasiness to the user. After a series of experiments conducted in this connection, it has been found that the stand-by time of about 1 second or less gives rise to no problem in practical applications.

I claim:

1. A method of automatic focusing in a video camera or the like which is designed for reproducing continuously a state or behavior of an object, comprising the steps of:

measuring a distance to said object;

detecting and recognizing whether or not said object is in motion; and controlling an interval of performing said distance measuring step in accordance with an output signal obtained in said detecting and recognizing step so that said interval is made longer when said output signal indicates that said object is not in motion but is stationary than the interval when said object is in motion.

2. A method according to claim 1 further comprising:
a step of detecting a lens position and producing a lens position signal, and wherein said detecting and recognizing step performs a comparison between a distance signal obtained in said distance measuring step and said lens position signal, and produces said output signal when said distance signal and said lens position signal are in coincidence thereby to perform said controlling step.

3. A method according to claim 2 further comprising:
a step of driving a lens, and wherein said detecting and recognizing step performs the comparison between said distance signal and said lens position signal, and produces a second signal when said both signals are not in coincidence thereby to perform said lens driving step, and a coincidence signal indicative of the coincidence of said distance signal and said lens position signal is produced when said coincidence is achieved as a result of said lens driving step.

4. A method according to claim 1 further comprising:
a step of initialization for supplying energy to perform said detecting and recognizing step and said distance measuring step and for setting an initiating time of said detecting and recognizing step and said distance measuring step, and wherein said control step includes to provide to said initialization step a predetermined stand-by time for activation of said initialization step in accordance with the output signal produced in said detecting and recognizing step.

5. An apparatus for automatic focusing in a video camera or the like which is designed for reproducing continuously a state or behavior of an object, comprising:

distance measuring means for measuring a distance to said object;

lens position detecting means for detecting a position of a taking lens;

comparing means for comparing a distance signal produced by said distance measuring means with a lens position signal produced by said lens position detecting means;

lens driving means for moving said taking lens to a focused position in response to an output signal of said comparing means;

trigger means for supplying energy to each of said means and setting operation timing in response to an activation signal applied externally; and control means activated in response to an in-focus signal produced by said comparing means when the focused state of said taking lens is achieved and for controlling the state set by said trigger means in such a manner that said trigger means is operated at a longer interval when said object is stationary as compared with when said object is in motion.

6. An apparatus according to claim 5, wherein said comparing means and said control means are constituted by a microprocessor for executing a first step for comparing to determine whether said distance signal coincides with said lens position signal, a second step selected when the result of said first step executed is inconsistent, to thereby produce a driving signal for initiating operation of said lens driving means, a third step which is selected in succession to execution of said second step for comparing said distance signal with the lens position signal derived from said taking lens being moved by said lens driving means, a fourth step which is selectively activated when the result of execution of said third step has proved to be consistent, to thereby produce a stop signal for stopping operation of said lens driving means, and a fifth step which is selectively activated when the result of comparison executed at said first step has proved to be consistent, to thereby setting a predetermined time interval, wherein operation of said trigger means is initiated in response to the output signal from said fourth or fifth step.

* * * * *